US008742054B2

(12) United States Patent
Bauchet et al.

(10) Patent No.: US 8,742,054 B2
(45) Date of Patent: Jun. 3, 2014

(54) POLYESTER-POLYURETHANE HYBRID RESIN MOLDING COMPOSITIONS COMPRISING POLYURETHANE WITH UNITS DERIVED FROM ALIPHATIC ISOCYANATES

(75) Inventors: Frédéric Bauchet, Liberty, MO (US);
Larry Morris, Smithville, MO (US);
Woody Holley, Gladstone, MO (US);
Kenneth Seroogy, Liberty, MO (US)

(73) Assignee: CCP Composites US, North Kansas City, MO (US)

( * ) Notice: Subject to any disclaimer, the term of this patent is extended or adjusted under 35 U.S.C. 154(b) by 600 days.

(21) Appl. No.: 11/465,529

(22) Filed: Aug. 18, 2006

(65) Prior Publication Data
US 2007/0049686 A1    Mar. 1, 2007

Related U.S. Application Data

(60) Provisional application No. 60/710,641, filed on Aug. 23, 2005.

(51) Int. Cl.
*C08G 18/10* (2006.01)
*C08G 18/67* (2006.01)

(52) U.S. Cl.
USPC ............ 528/75; 528/48; 528/50; 528/52; 528/55; 528/57; 528/83; 528/84; 528/85; 428/396; 428/423.1; 428/423.7; 428/423.3

(58) Field of Classification Search
USPC .......... 528/48, 50, 52, 55, 57, 75, 83, 84, 85; 525/440.01; 428/396, 423.1, 423.7, 428/423.3
See application file for complete search history.

(56) References Cited

U.S. PATENT DOCUMENTS

| | | | | |
|---|---|---|---|---|
| 4,107,101 | A * | 8/1978 | Kubens | 521/137 |
| 4,172,060 | A * | 10/1979 | Dalibor et al. | 525/32.1 |
| 4,280,979 | A | 7/1981 | Dunleavy et al. | |
| 4,497,918 | A * | 2/1985 | Wason | 523/220 |
| 4,822,849 | A * | 4/1989 | Vanderlaan | 525/17 |
| 5,142,015 | A | 8/1992 | Meixner et al. | |
| 5,153,261 | A * | 10/1992 | Brooks | 525/28 |
| 5,159,044 | A * | 10/1992 | Bogner | 528/75 |
| 5,296,544 | A * | 3/1994 | Heise et al. | 525/28 |
| 5,344,852 | A * | 9/1994 | Brooks et al. | 521/99 |
| 5,354,834 | A * | 10/1994 | Yoshida et al. | 528/59 |
| 5,821,296 | A | 10/1998 | Borden | |
| 5,851,667 | A * | 12/1998 | Yang et al. | 428/396 |
| 6,808,788 | B2 * | 10/2004 | Bogner | 428/114 |

FOREIGN PATENT DOCUMENTS

JP           60-245674         12/1985

* cited by examiner

*Primary Examiner* — Michael L Leonard
(74) *Attorney, Agent, or Firm* — Whyte Hirschboeck Dudek S.C.

(57) ABSTRACT

A hybrid resin composition is described, the composition comprising:
  A. An A part composition comprising an aliphatic polyfunctional isocyanate compound and a free radical polymerization initiator; and
  B. A B part composition comprising an ethylenically unsaturated, substantially water-free polyester polyol and a polyurethane catalyst.

The A part composition can contain a non-interfering solvent, e.g., styrene, and the B part composition typically has an acid value of 5 or less (based on solids). For outdoor use, the B part composition is preferably free of tertiary hydrogens, ether glycols and terephthalic acid residues.

19 Claims, No Drawings

POLYESTER-POLYURETHANE HYBRID RESIN MOLDING COMPOSITIONS COMPRISING POLYURETHANE WITH UNITS DERIVED FROM ALIPHATIC ISOCYANATES

CROSS REFERENCE TO RELATED APPLICATION

This application claims the benefit of U.S. Provisional Application Ser. No. 60/710,641 filed Aug. 23, 2005, and is incorporated herein by reference.

FIELD OF THE INVENTION

This invention relates to hybrid resins. In one aspect, the invention relates to hybrid resins comprising a polyester resin in combination with a polyurethane resin while in another aspect, the invention relates to hybrid resins in which the polyurethane comprises units derived from aliphatic isocyanates. In still another aspect, the invention relates to coatings made from such hybrid resins.

BACKGROUND OF THE INVENTION

Polyester-polyurethane hybrid resins are known in the art of thermoset molding compositions (e.g., U.S. Pat. No. 5,153,261). These resins are normally tougher than polyesters and stronger, stiffer and less expensive than polyurethanes. Typical of such resins are those comprising a hydroxy-terminated unsaturated polyester polyol, an ethylenically unsaturated monomer (e.g., styrene) and a polyisocyanate. They are easily adapted to many common thermoset molding techniques presently employed in the polyurethane and unsaturated polyester industries. Xycon® hybrid resins available from Cook Composites and Polymers are representative of these resins.

Hybrid resins are two component or part systems comprising an A part and a B part. The A part contains the polyisocyanate and a polyester catalyst, while the B part contains the hydroxy-terminated unsaturated polyester polyol/unsaturated monomer solution, optionally with a polyurethane catalyst and/or filler. Upon mixing parts A and B together under the appropriate conditions, an interpenetrating network of molecular chains is formed. The polyester component of the mix provides the chain extension function while the polyisocyanate component provides the crosslinking function. The result is a molded part or coating that demonstrates improved toughness and thermal properties over either component alone.

Gel coats are typically used as the outer or external surface layer of composite molded article because they impart a smooth, durable appearance to the article. Unsaturated polyesters resins are widely used for marine and cultured marble gel coats because they are inexpensive, easy with which to work, and cure at room temperature. Moreover, these resins provide a strong, flexible, abrasion and impact resistant surface. However, these coating properties require improvement in certain stressful applications, such as windmill blades. These applications require a coating with superior moisture-resistance, toughness (e.g., resistance to cracking) and similar properties that will protect the underlying laminate from deterioration by environmental forces.

SUMMARY OF THE INVENTION

In one embodiment, the invention is a hybrid resin composition comprising:

A. An A part composition comprising an aliphatic polyfunctional isocyanate compound and a free radical polymerization initiator; and B. A B part composition comprising an ethylenically unsaturated, substantially water-free, polyester polyol and a polyurethane catalyst.

The hybrid resin compositions comprise about 10 to 50 weight percent A part, about 50 to 90 weight percent B part. The molar ratio of NCO groups to OH groups is between 0.3 to 2.0, preferably between 0.5 to 1.5. The aliphatic polyfunction isocyanate in A part has the NCO content of 5 to 50 percent, preferably 10 to 35 percent. The A part composition can contain a non-interfering solvent, e.g., styrene, and the B part composition typically has an acid value of 10 or less, preferably 5 or less (based on solids) and a hydroxyl number on solids of about 120-170, preferably 130 to 160. For outdoor use, the B part composition is preferably free of hydrogens on tertiary carbon, ether glycols and terephthalic acid residues.

In another embodiment, the invention is a gel coat made from the hybrid resin and in still another embodiment, the invention is an article comprising a gel coat made from the hybrid resin.

DETAILED DESCRIPTION OF THE INVENTION

The ethylenically unsaturated monomer used in the B part composition of the hybrid resin can be any ethylenically unsaturated monomer capable of crosslinking the unsaturated polyester polyol via vinyl addition polymerization. Examples of useful ethylenically unsaturated monomers are styrene, o-, m-, p-methyl styrene, methyl acrylate, methyl methacrylate, t-butylstyrene, divinyl benzene, diallyl phthalate, triallyl cyanurate and mixtures of two or more unsaturated monomers. The preferred monomer is styrene because it provides an economical monomer solution.

The unsaturated polyester polyol has at least one dicarboxylic alkene moiety and is preferably an oligomer of an α,β-ethylenically unsaturated dicarboxylic acid compound obtained by the condensation reaction of one or more of a saturated di- or polycarboxylic acid or anhydride and an unsaturated di- or polycarboxylic acid or anhydride with a glycol or a polyhydric alcohol. The unsaturated polyester polyol can also be prepared from unsaturated di- or polycarboxylic acid(s) or anhydride(s) with glycols and/or polyhydric alcohol(s). The polyols used in this invention have an acid number or value of less than five, and preferably less than about two. Further, the polyols used in this invention have equivalent weights of between about 250 and about 1000, and preferably between about 250 and about 500. Examples of suitable saturated di- or polycarboxylic acids include isophthalic, orthophthalic, terephthalic, adipic, succinic, sebacic acid and mixtures of two or more of these compounds with isophthalic acid being preferred. Typical unsaturated carboxylic acids or anhydrides include maleic acid, fumaric acid, citraconic acid, chloromaleic acid, allyl succinic acid, itaconic acid, mesaconic acid, their anhydrides and mixtures of two or more such compounds, with maleic anhydride being the preferred choice. Examples of polyhydric alcohols which are useful in the invention include neopentyl glycol, ethylene glycol, diethylene glycol, triethylene glycol, propylene glycol, dipropylene glycol, 1,4-butanediol, polyethylene glycols, glycerol, mannitol, 1,2-propanediol, pentaerythritol, 1,6-hexanediol, 1,3-butylene glycol and mixtures of two or more of such compounds. For outdoor use, the B part composition is preferably free of tertiary hydrogens, ether glycols and terephthalic acid residues.

The B part composition should be substantially water-free. "Substantially water-free" means that the water content of the B part composition is sufficiently low to avoid unacceptable levels of foaming. Preferably, the B part composition comprises no more than about 2000 ppm water, preferably no more than about 1000 ppm water, based on the total weight of the B part composition.

The aliphatic isocyanate compound, typically referred to as an aliphatic polyisocyanate, must have at least two functional groups and be capable of reacting with the polyester polyol. Examples of suitable isocyanate compounds include 2,2,4-trimethyl-hexamethylene diisocyanate, hexamethylene diisocyanate, isophorone diisocyanate and their biuret and cyclic trimer forms. Preferably, the aliphatic isocyanate compound is hexamethylene diisocyanate, more preferably the dimer or trimer form of hexamethylene diisocyanate. In one embodiment, the aliphatic isocyanate compound may be modified with a polyol, such as a glycol, to provide a polymeric form for ease of handling. Typically, the isocyanate content ranges from about 5% to about 50%, more preferably from about 10% to about 35% based on the combined atomic weight of the isocyanate functional groups and the total molecular weight of the aliphatic isocyanate compound.

The free radical polymerization catalysts useful in producing the hybrid resin compositions of this invention are vinyl polymerization catalysts such as peroxides, persulfides, perborates, percarbonates, and azo compounds or any other suitable catalyst capable of catalyzing the vinyl polymerization of the polyester polyol and/or the ethylenically unsaturated monomer. Illustrative of a few such catalysts are benzoyl peroxide (BPO), tertiarybutyl peroxybenzoate (TBPB), 2,2'-azo-bis-isobutyronitrile, dibenzoyl peroxide, lauryl peroxide, di-t-butyl peroxide, diisopropyl peroxide carbonate and t-butyl peroxy-2-ethylhexanoate. Promoters can also be used in combination with vinyl polymerization peroxide catalysts to control the rate of free radical initiation. A common benzoyl peroxide promoter is N,N-diethylaniline.

Catalysts that are useful in catalyzing the polyurethane formation in producing the hybrid resin in accordance with this invention include: (a) tertiary amines such as N,N-dimethylcyclohexylamine; (b) tertiary phosphines such as trialkylphosphines; (c) strong bases such as alkali and alkaline earth metal hydroxides, alkoxides, and phenoxides; (d) acidic metal salts of strong acids such as ferric chloride; and (e) organometallic compounds such as dibutyltin dilaurate, bismuth carboxylate, and zirconium chelate 2,4-pentanedione. Other commonly used catalysts for making polyurethanes can be found in U.S. Pat. No. 4,280,979.

The hybrid resins of the invention can be prepared by a process based on liquid reactive molding or compression molding techniques commonly employed in the unsaturated polyester and polyurethane industries. Liquid molding is the direct injecting or pouring of a hybrid resin into a mold (closed molding) or onto a mold (open molding). In liquid injection closed molding, the polyisocyanate and hydroxy-terminated polyester in the monomer solution (polyol) are fed separately into the chamber of a mixing head where the two components are mixed. Upon mixing, the hybrid reaction begins instantaneously whereby the rate of reactivity is dependent on the catalyst used. The hybrid liquid stream is injected between mold halves wherein the reactions between the various components of the hybrid resin system continue. After sufficient time for cure, typically 1 to 120 minutes, preferably 2 to 60 minutes, the part is removed from the mold. The part can be used as molded or be further post-annealed in an oven. Common liquid closed molding techniques include resin transfer molding (RTM), reaction injection molding (RIM) and structural reaction injection molding (S-RIM).

It is also an object of the present invention to obtain a curable resin composition, comprising at least one hybrid resin as defined according to the invention, which can be used for preparing, by curing, coatings like gels coats (or barrier coats) or composite molded articles. So, the resins of the invention can be used for either composite molded articles, based on SMC, BMC, DMC or for coatings like gel coats (or barrier coats).

The coatings may be applied to a composite molded substrate made from either a resin according to the invention or from other resins, including UPR or vinyl ester or any other thermosetting resin.

Liquid injection open molding follows the same procedure except the hybrid resin is sprayed onto a mold where one side of the molded part is exposed to the atmosphere. This molding process is commonly termed "spray-up molding." Direct pour liquid molding comprises hand-mixing the polyol and polyisocyanate and then pouring the hybrid liquid into or onto a mold wherein curing occurs. The main differences between injection and pouring is the mix time, mix intensity and injection pressure. In both liquid molding techniques, the polyol and/or polyisocyanate can contain fibrous materials, fillers and/or other additives but in gel coat applications, the resin is typically free of any fibrous materials and fillers.

Hybrid resins are also amendable to compression molding. Common compression molding techniques include sheet, bulk or dough molding compounds, identified as SMC, BMC and DMC, respectively. Regardless of the molding technique employed, the hybrid resins of the invention have the advantages of improved shrinkage control, surface appearance and impact strength without significantly sacrificing thermal properties.

The gel coats of this invention are thick relative to a coat of paint but typically still less than half of a millimeter in thickness. For a liquid layer of this thickness to stay in place on a mold surface that is not in a horizontal orientation, the resin should be thixotropic. In other words, the viscosity is relatively low during applications by such means as spraying, brushing or rolling, but viscous enough to resist gravity as soon as the application procedure stops. Convenient thixotropic agents may be selected from: (fumed) silica, fatty acid amides, and clays at a weight content from 0.2 to 5% with respect to the weight of the B part.

In the molding process in which the hybrid resins are typically used, generally two or more shaped elements cooperate with one another to define a mold cavity. Otherwise a single cavity of complex shape can be provided. The hybrid resin of the present invention is applied to at least a portion of the overall mold surface. The mold contact surfaces may be formed from any conventional materials such as glass, reinforced polyesters, epoxies, steel, aluminum or other metals.

In one illustrative example, the A part or component of the hybrid resin comprises an isocyanate or an isocyanate solution in a non-interfering solvent such as styrene. Aliphatic isocyanates, such as 2,2,4-trimethyl-hexamethylene diisocyanate, are particularly well adapted for outdoor applications because of their resistance to yellowing or other discoloration relative to aromatic diisocyanates.

The B part side or component comprises unsaturated polyester resin, wetting agents, leveling aids, a promotion package, fillers, polyurethane catalyst, viscosity modifiers and pigments. One typical formula, in parts by weight, comprises the following:

| Component Description | Weight |
| --- | --- |
| unsaturated polyester polyol | 873.43 |
| black pigment dispersion | 1.12 |
| yellow iron oxide pigment dispersion | 1.80 |
| white pigment dispersion | 92.83 |
| air release agent | 2.5 |
| clay (quaternary ammonium treated) | 12.48 |
| talc | 12.48 |
| cobalt octoate solution | 0.87 |
| dibutyltin dilaurate | 1.25 |
| silicon fluid 200 cSt-fisheye eliminator | 1.25 |

As is evident from the above formulations, the hybrid resins of this invention can contain one or more additives such as fillers, pigments, processing aids, curing aids, anti-oxidants, UV-inhibitors, catalyst promoters and the like. These additives can be included in either or both of the A and B parts although inclusion in the B part composition is more typical. The following examples further illustrate the invention. In these examples, all viscosity measurements were taken after the viscometer was running at the set speed for about 2 minutes, Example 1

Preparation of Unsaturated Polyester Resin (Comparative)

Into a 4-liter flask equipped with agitator, condenser, thermometer, and pipe for introducing nitrogen gas were charged 740 grams of diethylene glycol, 456 grams of propylene glycol, 1060 grams of isophthalic acid. The mixture was heated at 210° C. for about 10 hours until the acid number drops to 10 mg KOH/g. After the temperature was reduced to 150° C., 624 grams of maleic anhydride was added into the mixture. The reaction was continued at 210° C. for another 6 hours to an acid number of 30 to 50 mg KOH/g. The product was blended with 1460 grams inhibited styrene to form 4000 grams clear resin solution (Resin A). The viscosity of resin solution is around 1000 cps at 63% solid content. The resin viscosity is measured by Brookfield viscometer with RVT #2 spindle at 20 rpm at 25° C.

Example 2

Preparation of Conventional Gel Coat (Comparative)

A gel coat composition is then prepared by blending the following ingredients;

| Component | Weight Percent |
| --- | --- |
| Resin A | 53.2 |
| Titanium Dioxide | 15.0 |
| Fumed Silica | 1.5 |
| Monomer | 19.4 |
| Talc | 10.5 |
| 12% Cobalt | 0.2 |
| Ethylene Glycol | 0.2 |

The resulting gel coat has a Brookfield viscosity of 19000 cps at 4 rpm at 77° F. (25° C.) and a thixotropic index of 6.0-7.0 (RVF #4 spindle, 2/20 rpm). 1.8% methyl ethyl ketone peroxide (MEKP) is used to cure the gel coat. The gel time is around 15 minutes and cure time is around 60 minutes. The weathering characteristics of the cured gel coat as measured by QUV-A, ASTM G154 using the standard 8 hours UV exposure at 60° C. followed by 4 hours condensation at 50° C., are listed below.

| Hours | Total Color change, ΔE | % Gloss Retention |
| --- | --- | --- |
| 0 | 0.00 | 100 |
| 500 | 1.52 | 99 |
| 1000 | 5.82 | 86 |
| 1500 | 5.73 | 12 |

Example 3

Preparation of OH-Terminated Unsaturated Polyester Resin

Into a 4-liter flask equipped with agitator, condenser, thermometer, and pipe for introducing nitrogen gas were charged 1380 grams of neopentyl glycol, 202 grams of propylene glycol, 994 grams of isophthalic acid. The mixture was heated at 210° C. for about 10 hours until the acid number drops to 10 mg KOH/g. After the temperature was reduced to 150° C., 587 grams of maleic anhydride was added into the mixture. The reaction was continued at 210° C. until an acid number of less than 5 mg KOH/g and an OH number of 130 to 150 mg KOH/g. The product was blended with 1160 grams inhibited styrene to form 4000 grams clear resin solution (Resin B). The viscosity of resin solution is 700 cps at 71% solid content Example 4

Preparation of Polyester-Polyurethane Hybrid Gel Coat

A two-component gel coat composition is then prepared by blending the following ingredients to form the B-side component:

| Component | Weight Percent |
| --- | --- |
| Resin B | 42.6 |
| Titanium Dioxide | 24.5 |
| Fumed Silica | 2.0 |
| Monomer | 19.9 |
| Talc | 10.1 |
| 12% Cobalt | 0.2 |
| Dibutyltin dilaurate | 0.3 |
| Ethylene Glycol | 0.3 |
| Promoter | 0.1 |

The resulting gel coat has a Brookfield viscosity of 15000 cps at 4 rpm at 77° F. (25° C.) and a thixotropic index of 5.0-6.0. The A-side component contains aliphatic diisocyanate and methyl ethyl ketone peroxide (MEKP). The A-side and B-side were mixed at the 20/80 ratio to cure the polyester-polyurethane hybrid gel coat. The gel time is around 15 minutes and cure time is around 60 minutes. The weathering characteristics of the gel coat as measured by QUV-A are listed below.

| Hours | Total Color change, ΔE | % Gloss Retention |
| --- | --- | --- |
| 0 | 0.00 | 100 |
| 500 | 0.60 | 100 |
| 1000 | 0.65 | 100 |
| 1500 | 0.78 | 100 |

Example 5

Comparison of 100 Hours Water Boil of Laminates

The gel-coated laminates were prepared with the gel coat samples from Examples 2 and 4. The laminate had two different thicknesses of gel coat. The thick section (TK) of gel coat had the cured gel coat thickness around 30 mils and the thin section (TN) of gel coat had the cured gel coat thickness around 15 mils. The panels were immersed in boiling de-ionized water for 100 hours and the performance was rated in a scale of 0-5 at 5 different categories. The 0 rating was indication of no change and the 5 rating was indication of extreme change. The results indicated the Polyester-Polyurethane Hybrid gel coat has much better water resistance compared to the conventional gel coat.

| 100 Hours Boil | Example 2 | Example 4 |
| --- | --- | --- |
| Blister (TK/TN) | 2.7/2.7 | 0/0 |
| Color Change (TK/TN) | 1.4/1.4 | 0.64/0.64 |
| Fiber Prom. Change (TK/TN) | 0.8/1.8 | 0.66/0.66 |
| Cracks (TK/TN) | 0.8/1.0 | 0/0 |
| Loss of gloss (TK/TN) | 0.3/0.3 | 0/0 |
| Total Rating (TK/TN) | 6.0/7.2 | 1.30/1.30 |

Example 6

Comparison of the Casting Mechanical Properties at Various Temperatures

The gel coat samples were made into castings and the tensile properties of the castings were measured following the ASTM Standard D-638. The tensiles properties were measured at the ambient temperature, −10° C., and −30° C. The results indicated the Polyester-Polyurethane Hybrid gel coat has much better retention of tensile elongation at the lower temperature compared to conventional gel coat.

| | Example 2 23° C. | Example 2 −10° C. | Example 2 −30° C. |
| --- | --- | --- | --- |
| Tensile Strength (MPa) | 49 ± 3 | 50 ± 4 | 41 ± 7 |
| Tensile Modulus (MPa) | 2299 ± 134 | 3013 ± 134 | 3107 ± 180 |
| Elongation (%) | 2.6 ± 0.2 | 2.2 ± 0.2 | 1.5 ± 0.3 |
| | Example 4 23° C. | Example 4 −10° C. | Example 4 −30° C. |
| Tensile Strength (MPa) | 44 ± 4 | 49 ± 3 | 50 ± 6 |
| Tensile Modulus (MPa) | 2038 ± 85 | 2441 ± 113 | 2713 ± 149 |
| Elongation (%) | 2.9 ± 0.4 | 2.4 ± 0.2 | 2.2 ± 0.3 |

Example 7

Comparison of the Reverse Impact Strength

The reverse impact strength of gel-coated laminate was measured by following the ASTM Standard D-3029. A total of 9 tests were conducted for each sample, and the average was reported. The results showed that the Polyester-Polyurethane Hybrid gel coat has much better reverse impact strength compared to conventional gel coat.

| Reverse Impact Test | Example 2 | Example 4 |
| --- | --- | --- |
| Ave. Number of Cracks | 14.8 | 5.7 |
| Std Dev. | 1.169 | 0.951 |
| Ave. Length of Crack (inch) | 1.25 | 0.88 |
| Std Dev. | 0.00 | 0.034 |
| Ave. Gel Coat Thickness (mil) | 23.0 | 20.0 |
| Std Dev. | 0.3 | 0.0 |
| Ave. Overall Thickness (inch) | 0.41 | 0.31 |
| Std Dev. | 0.012 | 0.09 |

While the invention has been described above in considerable detail, this detail is for the purpose of illustration and is not to be construed as a limitation on the spirit and scope of the invention as it is described in the following claims. All U.S. patents and allowed patent applications cited above are incorporated herein by reference.

What is claimed is:

1. A curable hybrid resin composition for preparing a gel coat, the curable hybrid resin composition comprising:
   A. An A part composition comprising an aliphatic polyfunctional isocyanate compound and a free radical polymerization initiator, and optionally a non-interfering solvent; and
   B. A substantially water-free B part composition comprising an ethylenically unsaturated, substantially water-free, polyester polyol and a polyurethane catalyst, and having a hydroxyl number of about 120-170; and
   either the A part or B part composition comprising a thixotropic agent and one or more additives;
   wherein when the curable hybrid resin composition is cured at room temperature to form a cured composition, the polymer component of the cured composition consists of the hybrid resin and the hybrid resin consists of polyester and polyurethane units.

2. The composition of claim 1 wherein the isocyanate compound is at least one of 2,2,4-trimethyl-hexamethylene diisocyanate, hexamethylene diisocyanate, isophorone diisocyanate, and biuret and cyclic trimer derivatives thereof.

3. The composition of claim 2 wherein the isocyanate compound is hexamethylene diisocyanate.

4. The composition of claim 3 wherein the hexamethylene is a cyclic trimer derivative.

5. The composition of claim 2 wherein the polyester polyol comprises at least one dicarboxylic alkene moiety.

6. The composition of claim 5 wherein the polyester polyol comprises an oligomer of an α,β-ethylenically unsaturated dicarboxylic acid compound obtained by the condensation reaction of one or more saturated di- or polycarboxylic acid or anhydride and an unsaturated di- or polycarboxylic acid or anhydride with a glycol or a polyhydric alcohol.

7. The composition of claim 6 wherein the free radical polymerization initiator is at least one of a peroxide, persulfide, perborate, percarbonate, and azo compound.

8. The composition of claim 7 wherein the polyurethane catalyst is at least one of a tertiary amine, tertiary phosphine, strong base, acidic metal salt, and an organometallic compound.

9. A composite molded article, wherein it is made by curing the composition as defined according to claim 1.

10. A gel coat, wherein it is made by curing a curable hybrid resin composition at room temperature, the curable hybrid resin composition comprising:
  A. An A part composition comprising an aliphatic polyfunctional isocyanate compound and a free radical polymerization initiator, and optionally a non-interfering solvent; and
  B. A substantially water-free B part composition comprising an ethylenically unsaturated, substantially water-free, polyester polyol and a polyurethane catalyst, and having a hydroxyl number of about 120-170; and
  either the A part or B part composition comprising a thixotropic agent and at least one of a filler and a pigment; and
  wherein the polymer component of the cured gel coat consists of the hybrid resin and the hybrid resin consists of polyester and polyurethane units.

11. A gel coat according to claim 10, coated on a composite molded substrate made from a hybrid resin according to claim 1 or from an unsaturated polyester resin, vinyl ester or thermosetting resin.

12. An article comprising the gel coat of claim 10.

13. An article comprising the gel coat of claim 11.

14. The composition of claim 1 wherein the B part composition comprises less than about 2000 ppm of water, based on the total weight of the B part composition.

15. The composition of claim 1, wherein the B part composition comprises less than about 1000 ppm of water, based on the total weight of the B part composition.

16. The gel coat of claim 10, wherein the B part composition has an acid value of about 10 or less and a hydroxyl number of about 120-170.

17. The gel coat of claim 10, wherein the A part composition comprises a non-interfering solvent selected from the group of ethylenically unsaturated monomers consisting of styrene, o-methyl styrene, m-methyl styrene, p-methyl styrene, methyl acrylate, methyl methacrylate, t-butylstyrene, divinyl benzene, diallyl phthalate, triallyl cyanurate, and mixtures thereof.

18. The gel coat of claim 10, wherein the hybrid resin composition comprises about 10-50% by weight of the A part composition, and about 50-90% by weight of the B part composition.

19. The gel coat of claim 10, wherein the B part composition further comprises said thixotropic agent at a weight content from about 0.2 to 5% by weight of the B part composition, said thixotropic agent selected from the group consisting of fumed silica, fatty acid amides and clays.

* * * * *